(12) United States Patent
Kurashima et al.

(10) Patent No.: US 10,185,097 B2
(45) Date of Patent: Jan. 22, 2019

(54) OPTICAL MODULE WITH MULTIPLE LENSES INCLUDING DUMMY LENS

(71) Applicant: FUJITSU COMPONENT LIMITED, Tokyo (JP)

(72) Inventors: Shigemi Kurashima, Tokyo (JP); Hongfei Zhang, Tokyo (JP); Shinichiro Akieda, Tokyo (JP); Osamu Daikuhara, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/952,628

(22) Filed: Apr. 13, 2018

(65) Prior Publication Data

US 2018/0231716 A1    Aug. 16, 2018

Related U.S. Application Data

(62) Division of application No. 15/270,142, filed on Sep. 20, 2016.

(30) Foreign Application Priority Data

Sep. 24, 2015  (JP) ................. 2015-187409

(51) Int. Cl.
G02B 6/38 (2006.01)
G02B 6/42 (2006.01)
G02B 6/32 (2006.01)

(52) U.S. Cl.
CPC ............ *G02B 6/385* (2013.01); *G02B 6/327* (2013.01); *G02B 6/3882* (2013.01); *G02B 6/4231* (2013.01); *G02B 6/4292* (2013.01); *G02B 6/4207* (2013.01); *G02B 6/4214* (2013.01)

(58) Field of Classification Search
CPC .................................. G02B 6/32; G02B 6/385
See application file for complete search history.

(56) References Cited

U.S. PATENT DOCUMENTS

| 6,947,671 B2 | 9/2005 | Sekiya et al. |
| 7,063,467 B2 | 6/2006 | Nagasaka et al. |
| 7,300,216 B2 | 11/2007 | Morse et al. |
| 7,369,328 B2 | 5/2008 | Yamamoto et al. |

(Continued)

FOREIGN PATENT DOCUMENTS

| JP | 04324406 A | * 11/1992 | ............... G02B 6/42 |
| JP | 2006-309113 | 11/2006 | |
| JP | 2009-020426 | 1/2009 | |

OTHER PUBLICATIONS

Office Action dated Apr. 30, 2018 issued with respect to the related U.S. Appl. No. 15/270,142.

*Primary Examiner* — Daniel Petkovsek
(74) *Attorney, Agent, or Firm* — IPUSA, PLLC

(57) ABSTRACT

An optical module for connecting a ferrule for connecting an optical fiber and a photoelectric transducer mounted on a substrate includes first lenses, second lenses, and a dummy lens. The first lenses are provided on a first side of the optical module to which the ferrule is to be connected. The second lenses and the dummy lens are provided on a second side of the optical module facing a surface of the substrate. The second lenses and the dummy lens are aligned on the same line. An image of the dummy lens is reflected from a mirror to be projected onto a plane on the first side of the optical module.

2 Claims, 19 Drawing Sheets

(56) References Cited

U.S. PATENT DOCUMENTS

| | | |
|---|---|---|
| 7,441,965 B2 | 10/2008 | Furuno et al. |
| 7,665,911 B2 | 2/2010 | Hamazaki |
| 7,894,691 B2 | 2/2011 | Ikeda et al. |
| 8,939,657 B2 | 1/2015 | Hung |
| 9,671,573 B2 | 6/2017 | Morioka et al. |
| 2003/0189777 A1* | 10/2003 | Iwasaki .................... G11B 5/78 360/25 |
| 2004/0067015 A1* | 4/2004 | Nakajima ............. G02B 3/0018 385/33 |
| 2013/0229703 A1* | 9/2013 | Kubota .................. G02B 3/005 359/355 |
| 2013/0343698 A1 | 12/2013 | Ko |
| 2014/0153881 A1 | 6/2014 | Liff et al. |
| 2016/0356973 A1* | 12/2016 | Zhang .................. G02B 6/4292 |

\* cited by examiner

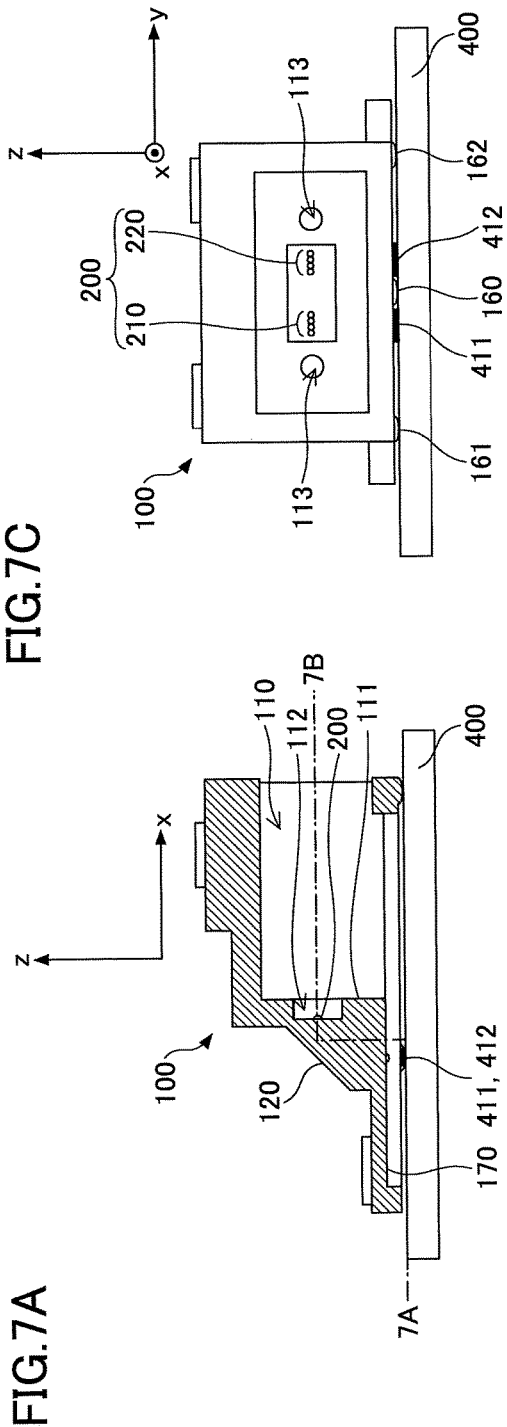
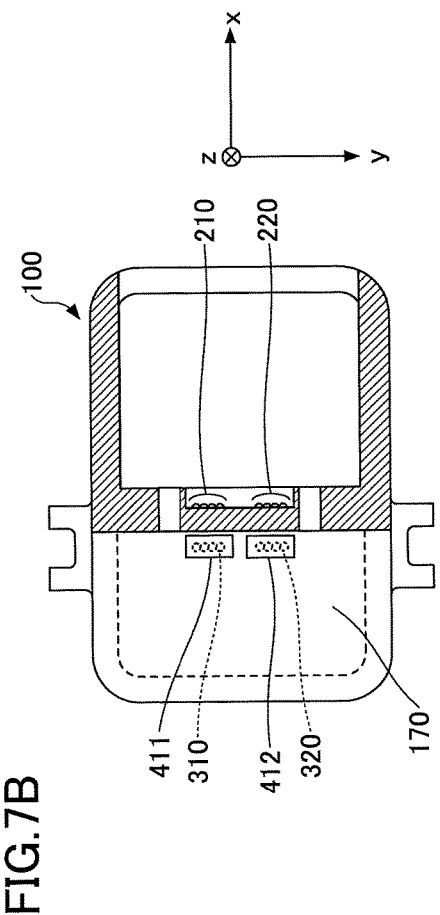
FIG.7A
FIG.7B
FIG.7C

OPTICAL MODULE WITH MULTIPLE LENSES INCLUDING DUMMY LENS

CROSS-REFERENCE TO RELATED APPLICATIONS

This application is a divisional application of U.S. patent application Ser. No. 15/270,142 filed on Sep. 20, 2016, which is based upon and claims the benefit of priority of prior Japanese Patent Application No. 2015-187409 filed on Sep. 24, 2015, where the entire contents of all applications are hereby incorporated by reference.

BACKGROUND

1. Field of the Invention

The present invention relates to an optical module and a method for inspecting the optical module.

2. Description of the Related Art

Optical communication/data transmission is widely used owing to advances in communication networks and communication control devices capable of communicating at high speed and in large amounts. Typically, an optical transceiver that can bi-directionally convert electric signals and optical signals is used for connecting an optical fiber and a device. The optical transceiver includes an optical module that forms an optical path between an optical fiber and an photoelectric transducer.

[Patent Document 1]: Japanese Laid-Open Patent Publication No. 2009-20426

[Patent Document 2]: Japanese Laid-Open Patent Publication No. 2006-309113

The optical module of a related art requires a number of components and many steps to be manufactured. This leads to consumption of time and increase in manufacturing costs. For example, in the optical modules disclosed in Patent Documents 1 and 2, requires to, fill a groove with a core material to form an optical fiber core in an optical waveguide, provide an over-clad film on the groove filled with the core material, and cure the over-clad film with ultraviolet.

Multiple lenses are provided in the optical module. However, loss of optical signals may occur if the lenses are formed at positions that deviate from their desired positions. Thus, there is a demand for an optical module that facilitates inspection for determining whether the lenses of the optical module are accurately positioned in their desired position.

SUMMARY

An embodiment of the present invention provides An optical module for connecting a ferrule for connecting an optical fiber and a photoelectric transducer mounted on a substrate. The optical module includes first lenses provided on a first side of the optical module to which the ferrule is to be connected, second lenses provided on a second side of the optical module facing the substrate, an inclined plane provided between the first lenses and the second lenses, and inclined with respect to a surface of the substrate, and a guide hole formed in the inclined plane, to which a guide pin of the ferrule is inserted.

Other objects and further features of the present invention will be apparent from the following detailed description when read in conjunction with the accompanying drawings.

BRIEF DESCRIPTION OF THE DRAWINGS

FIGS. 7A-7C are schematic diagrams illustrating the optical module of the first embodiment;

DESCRIPTION OF EMBODIMENTS

Figure 1A:
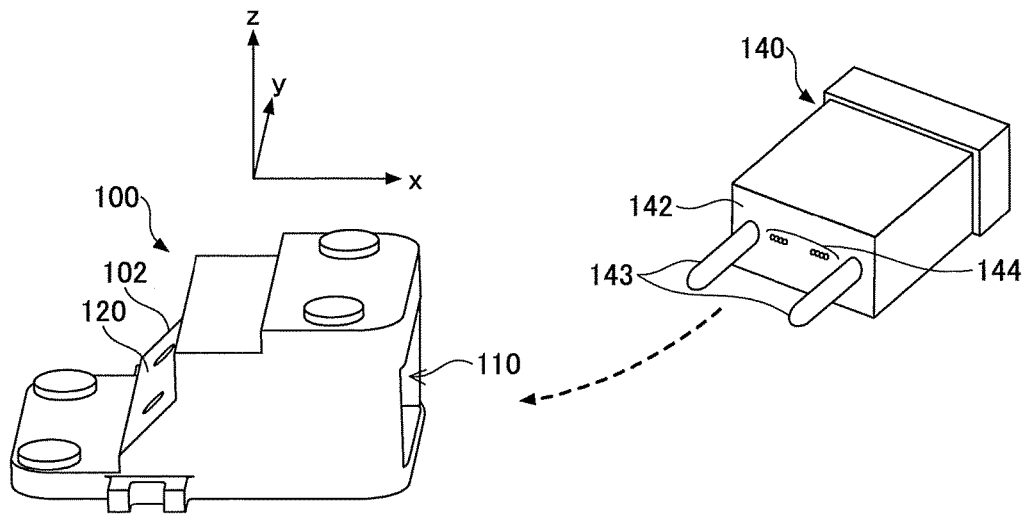
FIGS. 1A and 1B are schematic diagrams illustrating an optical module of the first embodiment.

In the following, embodiments of the present invention are described with reference to the accompanying drawings. It is to be noted that like components are denoted with like reference numerals throughout the following description and drawings.

<First Embodiment>

An optical module according to an embodiment of the present invention is described. Throughout the drawings, the x axis indicates the longitudinal direction of the optical module, the y axis indicates the width direction of the optical module, and the z axis indicates the height direction of the optical module.

Figure 1B:
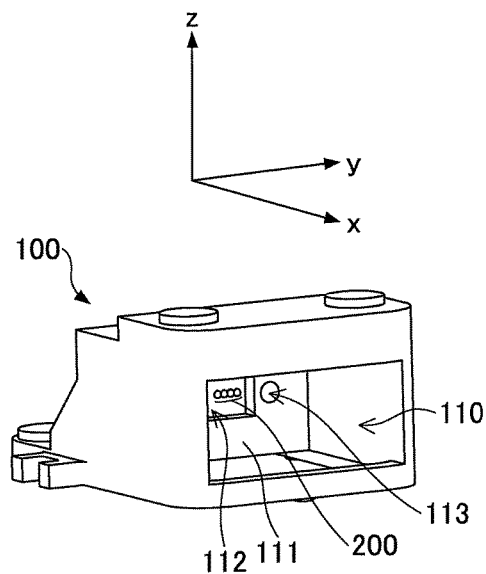

FIGS. 1A and 1B are perspective views illustrating an optical module 100 of the first embodiment. The optical module 100 is formed a transparent resin such as an olefin resin. The olefin resin forming the optical module 100 has a refractive index greater than 1.5 and a transmittance greater than 92%.

As illustrated in FIG. 1A, the optical module 100 includes an insertion hole 110 into which a part of a Mechanical Transfer (MT) ferrule 140 is inserted. Although not illustrated in the drawings, the MT ferrule 140 is connected to an optical fiber. By inserting the MT ferrule 140 into the insertion hole 110, the MT ferrule 140 and the optical module 100 are connected. A vapor deposition film is deposited on at least a part of an inclined plane 102 of the optical module 100.

As illustrated in FIG. 1B, a bottom plane 111 is formed in the far end of the insertion hole 110. The bottom plane 111 contacts a front end plane 142 of the MT ferrule 140 inserted into the insertion hole 110. Note that, throughout the following description and the accompanying drawings, the term "bottom plane" is one embodiment of the term "inclined plane".

Two guide pins 143 are provided on the front end plane 142 of the MT ferrule 140. Guide holes 113 into which the guide pins are inserted and engaged are provided on the bottom plane 111. The guide holes 113 are formed to match with the position, the size, and the number of the guide holes 113. In the first embodiment, each of the guide pins 143 has a cylindrical shape, and two circular-shaped guide holes 113 are formed in the bottom plane 111 in correspondence with the shapes of the guide pins 143.

The optical module 100 has a concave part 112 provided in the bottom plane 111. The concave part 112 is recessed in the x-axis direction with respect to the bottom plane 111. A first lens group 200 including incident and emitting lenses is provided in the concave part 112.

An opening group 144 including multiple openings for inputting and outputting optical signals is provided on the front end plane 142. The optical signals propagated inside the optical fiber are passed through the openings of the opening group 144 to be incident to an incident lens of the optical module 100. Further, the optical signals emitted from an emitting lens of the optical module 100 are passed through the openings of the opening group 144 to be incident to the optical fiber.

Figure 2A:
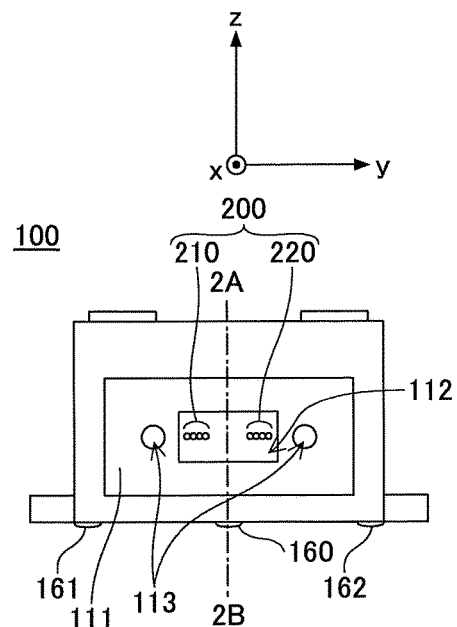
FIGS. 2A-2C are schematic diagrams illustrating the optical module of the first embodiment.
Figure 2B:
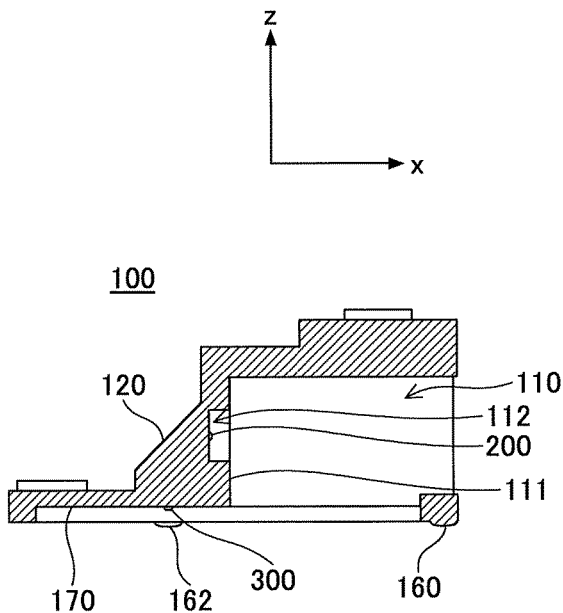
Figure 2C:
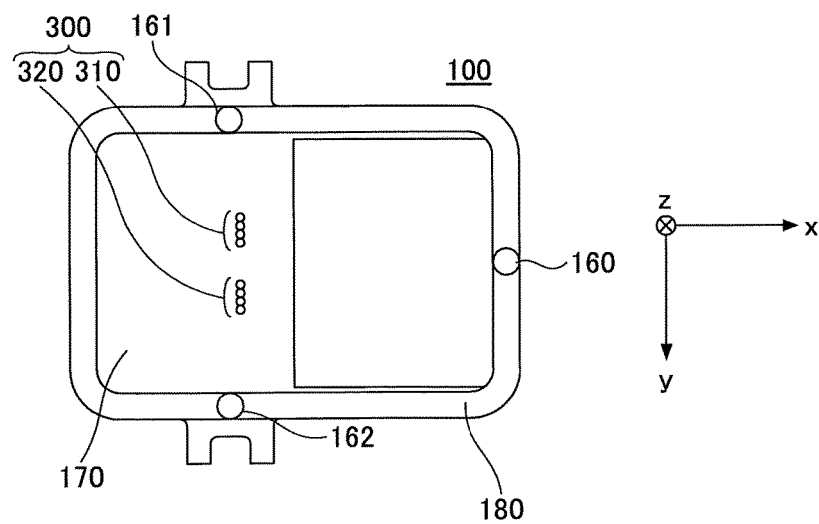

Next, the optical module 100 is described with reference to FIGS. 2A to 2C. FIG. 2A is a rear view of the optical module 100. FIG. 2B is a cross-sectional view of the optical module 100 taken along line 2A-2B of FIG. 2A. FIG. 2C is a bottom view of the optical module 100.

As illustrated in FIG. 2A, the first lens group 200 includes four incident lenses 210 and four emitting lenses 220 each of which arranged along the y-axis direction. Therefore, the optical module 100 can transfer four channels of optical signals.

The incident lenses 210 are aspheric lenses, and convert the optical signals emitted from the optical fiber into parallel light. The optical signals that are propagated through the optical fiber are guided into the optical module 100 in the form of parallel light. The emitting lenses 220 are aspheric lenses, and converge the optical signals propagated through the optical module 100 to the optical fiber. The aspheric lenses can reduce loss of the optical signals.

The guide holes 113, that are provided at the bottom plane on both sides of the first lens group 200 in the y-axis, extend along the x-axis. The MT ferrule 140 inserted into the insertion hole 110 and the optical module 100 are connected by engaging the guide pins 143 of the MT ferrule 140 to the guide holes 113. Thereby, the positions between the MT ferrule and the optical module 100 are defined.

A second lens group 300 is provided at a bottom plane 170 of the optical module 100. Legs 160 to 162 are provided at a peripheral part 180 of the bottom plane 170. The legs 160 to 162 contacts a printed circuit board ("substrate") to which the optical module 100 is placed.

The second lens group 300 includes four emitting lenses 310 and four incident lenses 320 each of which arranged along the y-axis. In the first embodiment, the emitting lenses 310 are aspheric lenses, and converge and emit the optical signals propagated through the optical module 100. The optical signals emitted from the emitting lens 310 are incident on a photoelectric transducer (e.g., photodetector) mounted on a printed board.

The incident lenses 320 are aspheric lenses, and convert the optical signals emitted from a photoelectric transducer (e.g., Vertical Cavity Surface Emitting Laser (VCSEL) not illustrated)) into parallel light and guide the parallel light into the optical module 100. The incident optical signals from the incident lens 320 are propagated inside the optical module 100 in the form of parallel light.

Figure 3A:
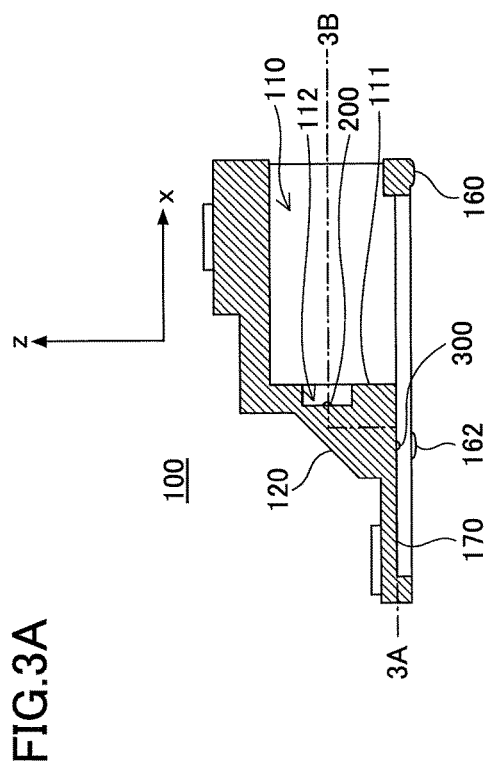
FIGS. 3A-3C are schematic diagrams illustrating the optical module of the first embodiment.
Figure 3B:
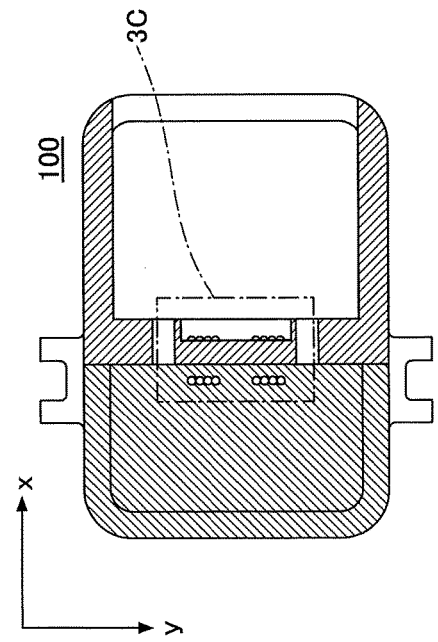
Figure 3C:
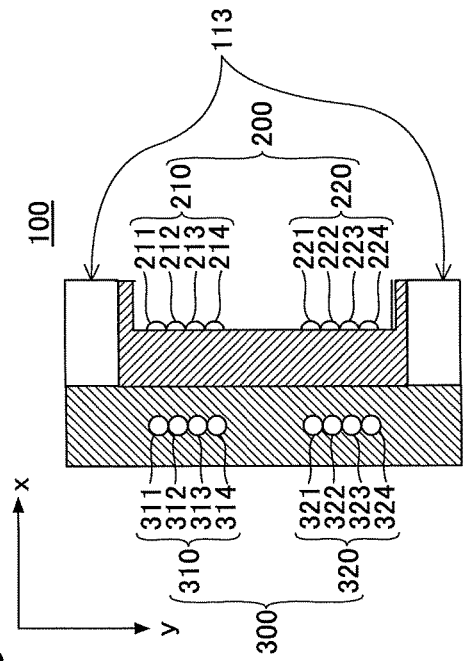

Next, the relationship between the first lens group 200 and the second lens group 300 is described with reference to FIGS. 3A to 3C. FIG. 3A is a cross-sectional view of the optical module 100 depicted in FIG. 2A. FIG. 3B is a bottom cross-sectional view of the optical module 100 taken along the chain line 3A-3B of FIG. 3A. FIG. 3C is an enlarged view of a region encompassed by the chain line 3C of FIG. 3B.

As illustrated in FIG. 3C, the lenses 211 to 214 included in the incident lens 210 correspond with the lenses 311 to 314 included in the emitting lens 310, respectively. Further, the lenses 221 to 224 included in the emitting lens 220 correspond with the lenses 321 to 324 included in the incident lens 320, respectively.

Figure 4A:
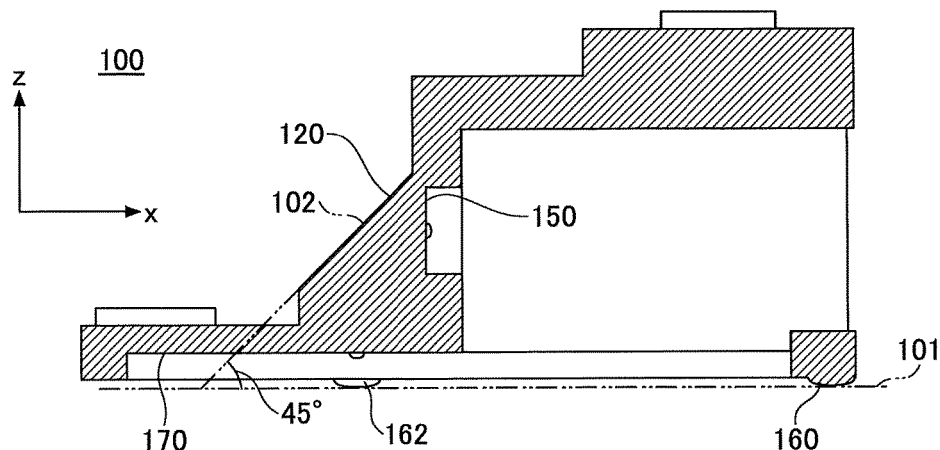
FIGS. 4A-4C are schematic diagrams illustrating an optical path of the optical module of the first embodiment.

Next, the light path through which optical signals propagate inside the optical module 100 is described with reference to FIGS. 4A to 4C. In FIG. 4A, a plane 101 is a flat plane defined by the edges of the legs 160 to 162, and is parallel with a surface of the printed board. Further, the inclined plane 102 is a surface on which the mirror 120 is formed. In the first embodiment, the angle formed by the plane 101 and the inclined surface 102 is 45 degrees. The plane 101 is parallel with the bottom plane 170 and orthogonal to the bottom plane 150.

Figure 4B:
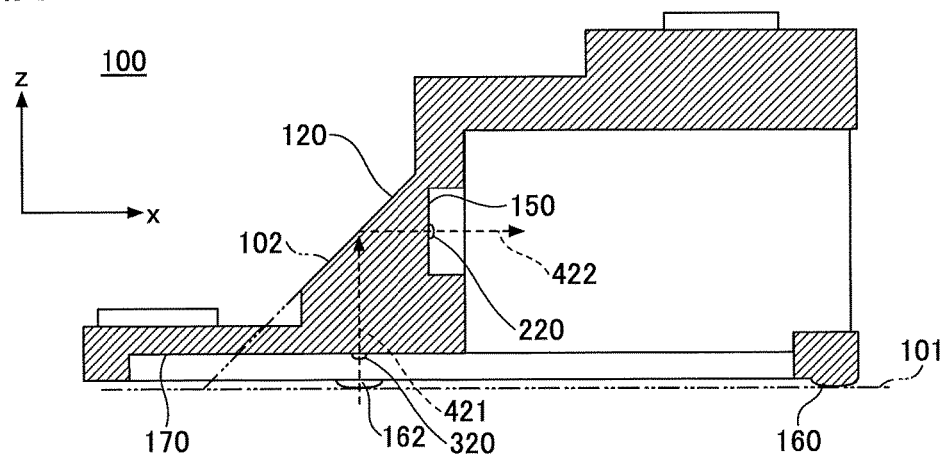

As illustrated in FIG. 4B, the optical signal 421 emitted perpendicularly to the plane 101 from the VCSEL (not illustrated in FIG. 4B) directly below the incident lens 320 is propagated into the optical module 100 in a direction orthogonal to the bottom plane 170, that is, a direction orthogonal to the plane 101. The optical signal 421 being propagated into the optical module 100 is reflected by the mirror 120. As the inclined plane 102 has an angle of 45 degrees relative to the plane 101, the optical signal 422 reflected by the mirror 120 propagates in a direction parallel with the plane 101. The center of the light ray of the optical signal 422 matches the center axis of the emitting lens 220, and the optical signal 422 reflected by the mirror 120 is emitted from the emitting lens 220.

Figure 4C:
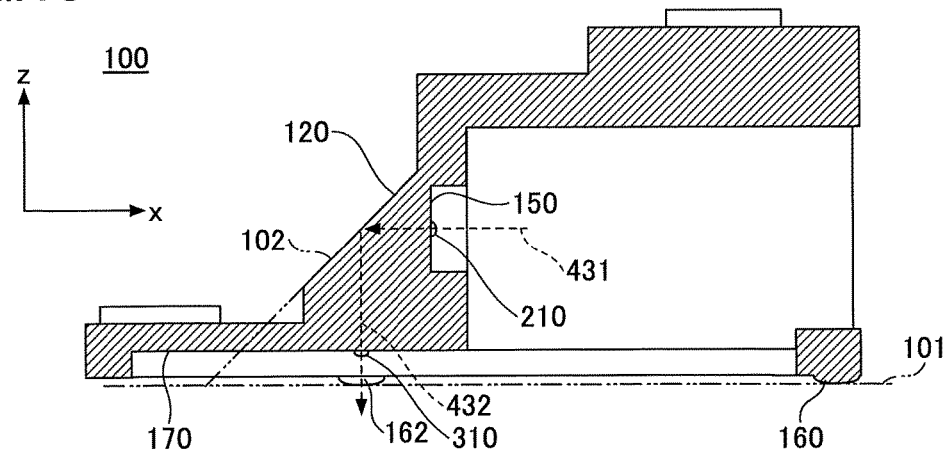

Similarly, as illustrated in FIG. 4C, the optical signal 431 emitted from the MT ferrule 140 (not illustrated in FIG. 4C) perpendicularly relative to the bottom plane 150 propagates into the optical module 100 in a direction parallel to the plane 101 via the incident lens 210 and is reflected by the mirror 120. The optical signal 432 reflected by the mirror 120 propagates in a direction perpendicular to the plane 101, that is, the bottom plane 170, and is then emitted from the emitting lens 310 and is incident on the photodetector.

In the optical module 100 of the first embodiment, the mirror 120 is provided at the light path between the incident lens 210 and the emitting lens 310 and the light path between the incident lens 320 and the emitting lens 220.

Figure 5A:
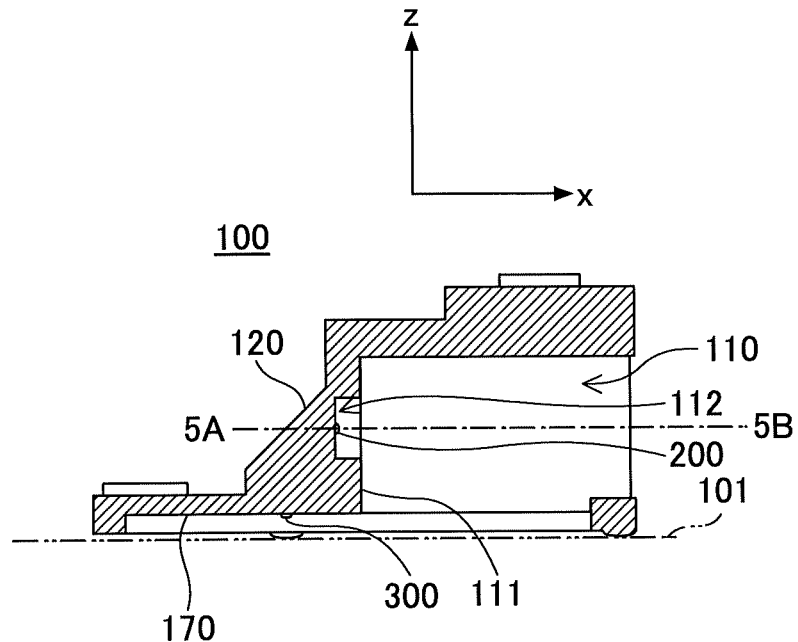
FIGS. 5A and 5B are schematic diagrams illustrating the optical module of the first embodiment.
Figure 5B:
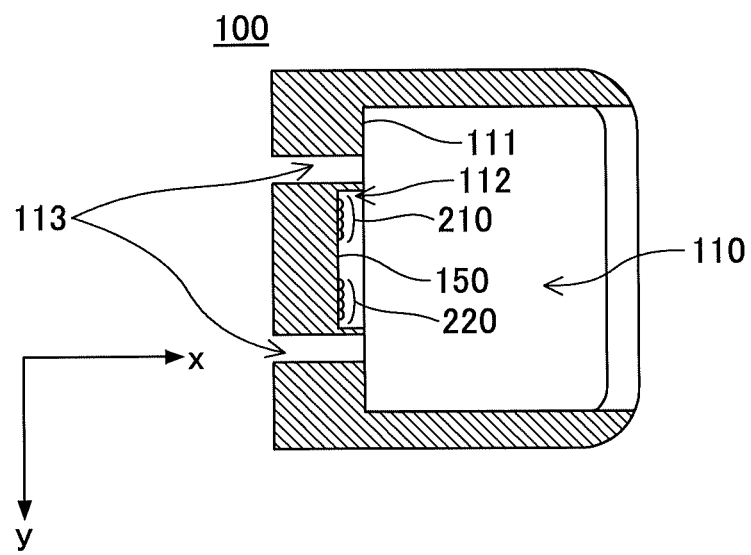

Next, a method for connecting the optical module 100 and the MT ferrule 140 is described with reference to FIGS. 5A and 5B. FIG. 5A is a cross-sectional view of the optical module 100. FIG. 5B is a cross-sectional view of the optical module 100 taken along a chain line 5A-5B of FIG. 5A and observed from the side of the bottom plane 170.

As illustrated in FIG. 5B, the guide holes 113, that are provided outside the concave part 112 on both sides of the first lens group 200 in the y-axis, extend along the x axis. The guide holes 113 are formed to be perpendicular to the bottom plane 111 and parallel with the plane 101. The two guide holes 113 are through-holes penetrating the optical module 100 from the bottom plane 111 toward the inclined plane 102.

Next, an optical transceiver 420 is described with reference to FIGS. 6A and 6B.

Figure 6A:
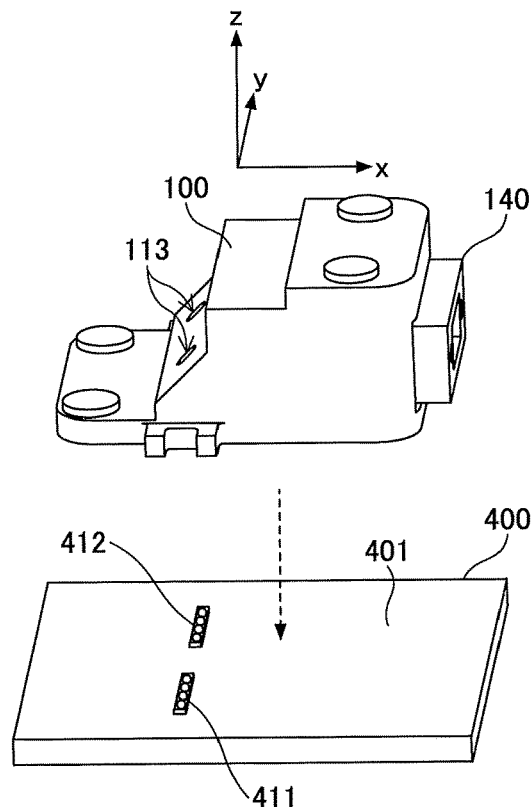
FIGS. 6A and 6B are schematic diagrams illustrating the optical module of the first embodiment.
Figure 6B:
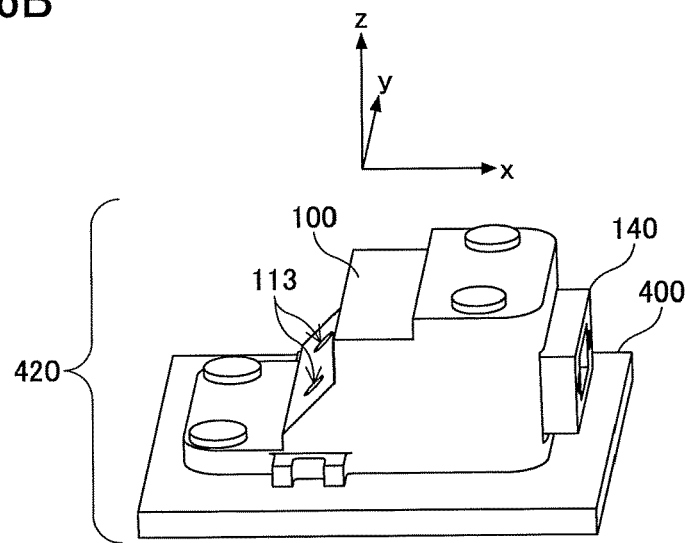

As illustrated in FIG. 6A, a photodetector 411 and the VCSEL 412 are mounted on the printed board 400. The photodetector 411 detects the optical signals incident on the plane 401. The VCSEL 412 emits optical signals perpendicularly to the plane 401.

After positioning the emitting lens 310 directly above the photodetector 411 and the incident lens 320 directly above the VCSEL 412, the optical module 100 is placed on the printed board 400. FIG. 6B depicts the optical transceiver 420 in a state where the optical module 100 is placed on the printed board 400 and the MT ferrule 140 is connected.

Next, the positional relationship between the second lens group 300, the photodetector 411, and the VCSEL 412 is described with reference to FIGS. 7A to 7C. FIG. 7A is a cross-sectional view of the optical module 100. FIG. 7B is a cross-sectional view of the optical module 100 taken along the chain line 7A-7B of FIG. 7A and observed from the bottom plane 170. FIG. 7C is a rear view of the optical module 100 placed on the printed board 400.

As illustrated in FIG. 7B, the optical module 100 is positioned relative to the printed board 400 so that the position of the VCSEL 412 and the position of the incident lens 320 overlap and that the position of the photodetector 411 and the position of the emitting lens 310 overlap. The emitting lens 310 and the incident lens 320 are formed on the side of the optical module 100 facing the printed board 400. The legs 160-162 are formed to have a height that enables the VCSEL 412 and the photodetector 411 to be accommodated between the bottom plane 170 and the printed board 400.

Figure 8A:
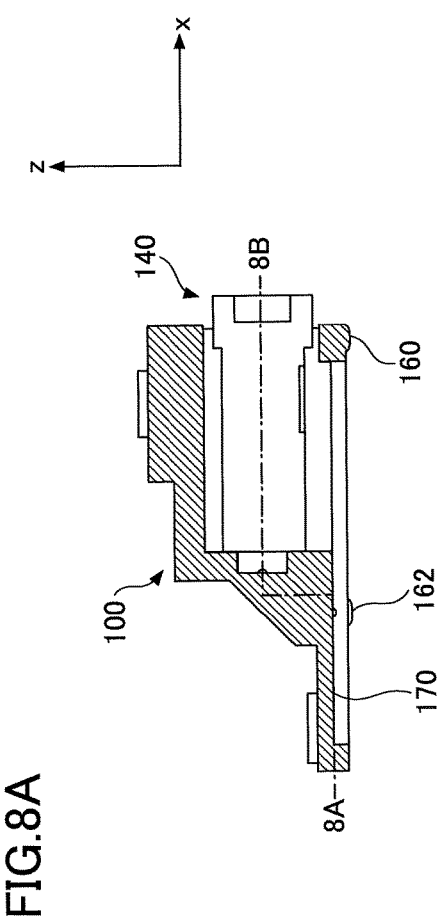
FIGS. 8A-8C are schematic diagrams illustrating the optical module of the first embodiment.
Figure 8C:
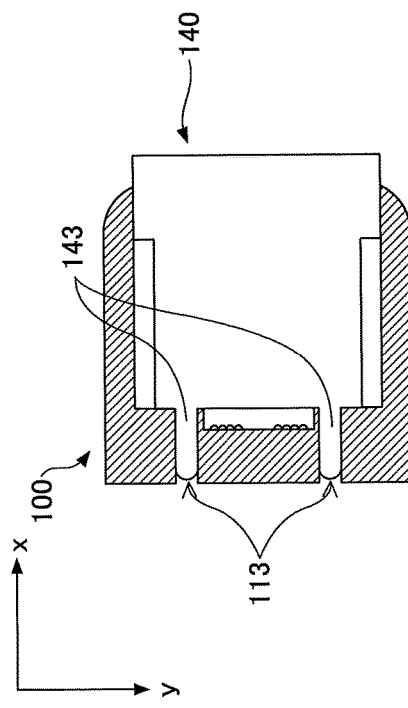
Figure 8B:
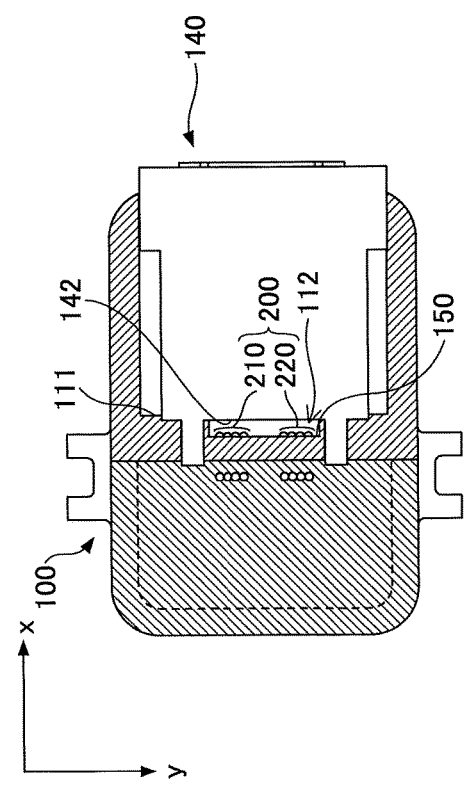

Next, the positional relationship between the optical module 100 and the MT ferrule 140 is described with reference to FIGS. 8A to 8C. FIG. 8A is a cross-sectional view of the optical module 100 to which the MT ferrule 140 is connected. FIG. 8B is a cross-sectional view of the optical module 100 taken along the chain line 8A-8B of FIG. 8A and observed from the bottom plane 170. FIG. 8C illustrates the optical module 100 in a state the guide pin 143 engaged with the guide hole 113.

As illustrated in FIG. 8B, the front end plane 142 contacts the bottom plane 111. The concave part 112 is provided in the far end of the bottom plane 111 and the first lens group 200 is provided on the bottom plane 150. Thereby, a space is created between the first lens group 200 and the front end plane 142. Thus, the front end plane 142 and the first lens group 200 are prevented from directly contacting each other even in a state where the MT ferrule 140 is connected to the optical module 100.

The guide pin 143 provided in the MT ferrule 140 connected to the optical module 100 engages the guide hole 113, so that the position of the MT ferrule 140 and the position of the optical module 100 match.

Next, the processes of manufacturing the optical module 100 of the first embodiment are described. The optical module 100 is manufactured by integrally forming the legs 160 to 162, the inclined plane 102, the incident lens 320, the emitting lens 310, the incident lens 210, and the emitting lens 220 by injection molding, and then forming a vapor deposition film on the inclined plane 102.

In contrast, an optical module of a related art is manufactured by filling the multiple grooves formed on the molded optical module with a filling material, adhering an over-clad film to an area including the core, and curing the over-clad film by ultraviolet.

With the optical module 100 of this embodiment, the number of components and the number of processes for manufacturing the optical module 100 can be reduced comparing to the related art.

If the total reflection of the optical signals can be achieved by the inclination plane 102, the vapor deposition film need not be formed on the inclination plane 102. However, loss of optical signals may occur at the reflecting plane of the mirror 120 due to staining of the inclined plane 102 if the vapor deposition film is not formed on the inclined plane 102. Therefore, the vapor deposition film is preferred to be formed on the inclined plane 102 for preventing loss of optical signals.

In the first embodiment, the optical module 100 may be formed with a material having a refractive index higher than 1.42 when the inclined plane 102 and the flat plane 101 form an angle of, for example, 45 degrees in order for the inclined plane 102 to achieve total reflection of the optical signals propagated inside the optical module 100.

Next, the loss of optical signals occurring along with the transmission of optical signals through the optical module 100 of the first embodiment is described.

In the optical module 100, the loss of optical signals may occur in three parts of the optical module 100.

The loss of optical signals emitted from an optical fiber may occur when the optical signals are incident to the optical module 100 via the incident lens 210, when the optical signals are reflected by the mirror 120, and when the optical signals are emitted from the emitting lens 310.

Further, the loss of optical signals emitted from the VCSEL 412 may occur when the optical signals are incident to the incident lens 320, when the optical signals are reflected by the mirror 120, and when the optical signals are emitted from the emitting lens 220.

In an optical module of a related art, the loss of optical signals may occur in four parts of the optical module.

The loss of optical signals transmitted from an optical fiber occurs when the optical signals are incident to the optical module via an incident lens, when the optical signals from an incident lens are incident to a core, when optical signals are emitted from the core, and when optical signals emitted from the core are emitted from the emitting lens.

Accordingly, with the optical module 100 of the first embodiment, the number of areas at which loss of optical signals occurs is less compared to the optical module of the related art, and loss of optical signals can be reduced. For example, if loss of optical signals in the optical module of the related art is approximately 6 dB, the optical module 100 of the first embodiment can constrain the loss of optical signals to approximately 4.5 dB.

Because the optical module 100 does not require materials such as a core material or an over-clad material, the optical module 100 can be manufactured more easily compared to the optical module of the related art. Further, loss of optical signals can be reduced compared to the optical module of the related art.

Although aspheric lenses are used as the incident lenses 210, 320 and the emitting lenses 220, 310 in the above-described embodiment, spherical lenses may also be used. Because the spherical lenses are easy to fabricate, the optical module can further be manufactured inexpensively.

<Positions of First Lens Group and Second Lens Group>

In the optical module 100, the optical axes of the incident/emitted lights deviate from the centers of the lenses of the first and second lens groups when the lenses of the first and second lens groups are formed at positions deviating from desired positions. Such deviation leads to loss of optical signals and may prevent communication of optical signals when the loss of optical signals is large.

Whether the positions of the lenses of the first or second lens groups 200, 300 are formed at positions deviating from their desired positions can be confirmed when an optical transceiver is fabricated by placing the optical module 100 on the substrate 400 mounted with the photodetector 411 and the VCSEL 412 and connecting the optical module 100 to the MT ferrule 140. However, manufacture loss can be reduced and design change or the like can be promptly achieved if the confirming of the positions of the lenses of the first and second lens groups can be executed immediately after the optical module 100 is molded.

In the first embodiment, the two guide holes 113 are used as references for measuring the positions of lenses. When designing the optical module 100, the center of each lens is positioned on an imaginary line that runs through the center of each of the two guide holes 113. Owing to this procedure, the positions of the two guide holes 113 can be used as references for determining the position of each lens.

Figure 9:
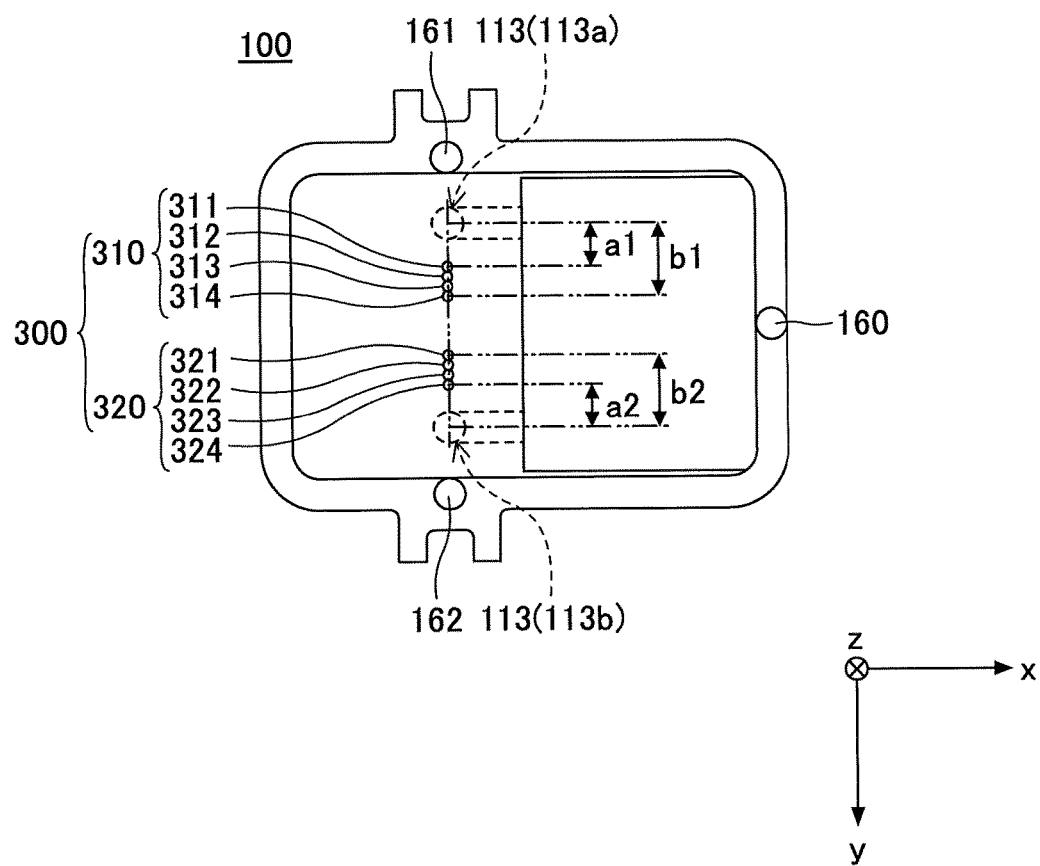
FIG. 9 is a schematic diagram illustrating the optical module of the first embodiment.

The two guide holes 113 are through-holes that penetrate the optical module 100 from the bottom plane 111 to the inclined plane 102. Because the optical module 100 is formed of a transparent resin, the contours of the guide holes 113 penetrating the inclined plane 102 are visible from a bottom surface of the optical module 100. Therefore, the guide holes 113 penetrating the inclined plane 102 can be seen through the optical module 100, so that the positions of the guide holes 113 can be measured as illustrated in FIG. 9.

The position of the emitting lens 310 in the y-axis direction can be obtained by measuring the center of a first guide hole 113a, measuring the length a1 along y-axis from the center of the first guide hole 113a to the center of the lens 311 nearest to the first guide hole 113a, and measuring the length b1 along y-axis from the center of the first guide hole 113a to the center of the lens 314 farthest from the first guide hole 113a.

By measuring the lengths a1 and b1, whether the emitting lens 310 is appropriately positioned in the y-axis direction can be determined.

In a similar manner, the position of the incident lens 320 can be inspected. The position of the incident lens 320 in the y-axis direction can be obtained by measuring the position of the center of a second guide hole 113b by seeing through the transparent optical module 100, measuring the length a2 along y-axis from the center of the second guide hole 113b to the center of the lens 324 nearest to the second guide hole 113b, and measuring the length b2 along y-axis from the center of the second guide hole 113b to the center of the lens 321 farthest from the second guide hole 113b.

By measuring the lengths a2 and b2, whether the incident lens 320 is appropriately positioned in the y-axis direction can be determined.

The position of the second lens group 300 in the x-axis direction can be obtained by referring to an imaginary line connecting the center of the first guide hole 113a and the center of the second guide hole 113b. Assuming that the center of each guide hole 113 and the center of each lens are positioned on the same straight line along y-axis as illustrated in FIG. 9, whether the center of each lens is positioned on the imaginary line connecting the centers of the guide holes 113 can be determined by measuring the position of the center of each guide hole 113 and the position of each lens and comparing the measured positions of the guide holes 113 with the measured positions of the lenses.

The position of the first lens group 200 can be determined by measuring the position of each guide hole 113 from the rear side of the optical module 100, measuring the position of each lens, and comparing the measured position of each guide hole 113 with the measured position of each lens.

As the guide hole 113 is a hole for positioning the MT ferrule 140 relative to the optical module 100 by inserting the guide pin 143 when connecting the optical module 100 to the MT ferrule, whether the optical axis of the light propagated from an optical fiber connected to the MT ferrule 140 matches the positions of the emitting lens 310 and the incident lens 320 of the second lens group 300 can be determined by measuring the positions of the emitting lens 310 and the incident lens 320 based on the position of the guide hole 113. Accordingly, whether the second lens group 300 is formed in a desired position with hardly any optical loss can be determined.

Because the guide hole 113 is penetrating the inclined plane 102, an edge of the guide hole 113 formed in the inclined plane 102 can be clearly seen from the bottom plane 170, and the shape of the guide hole 113 can be accurately observed. Accordingly, the position of the center of the guide hole 113 can be accurately recognized. Thus, the positions of the emitting lens 310 and the incident lens 320 can be accurately recognized.

<Second Embodiment>

Figure 10:
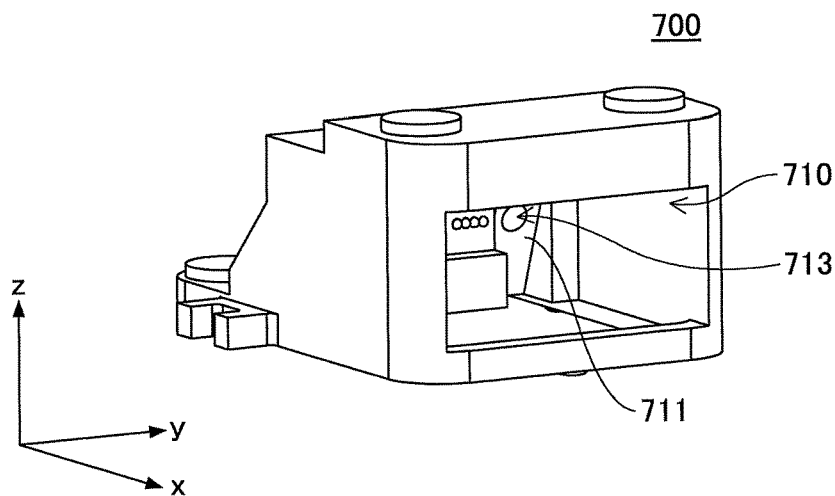
FIG. 10 is a schematic diagram illustrating an optical module of the second embodiment.
Figure 11:
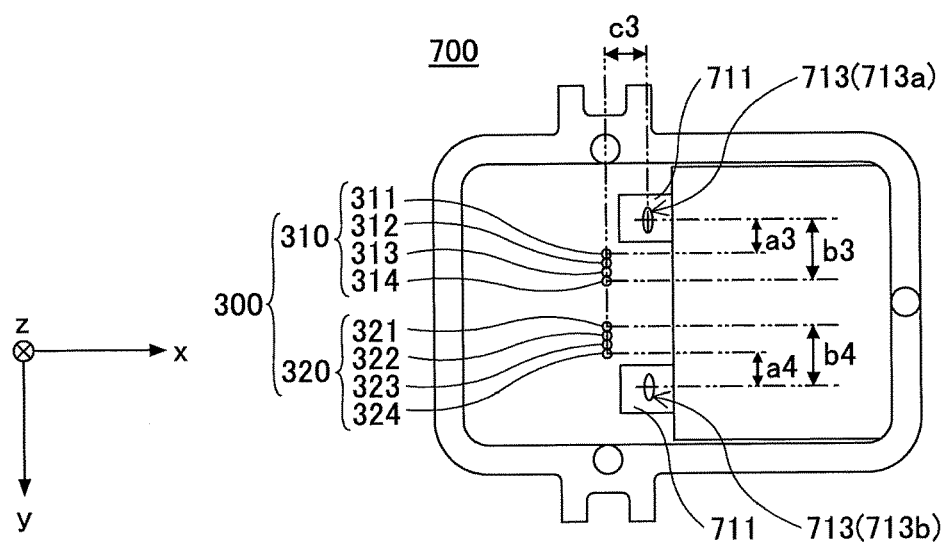
FIG. 11 is a schematic diagram illustrating the optical module of the second embodiment.
Figure 12:
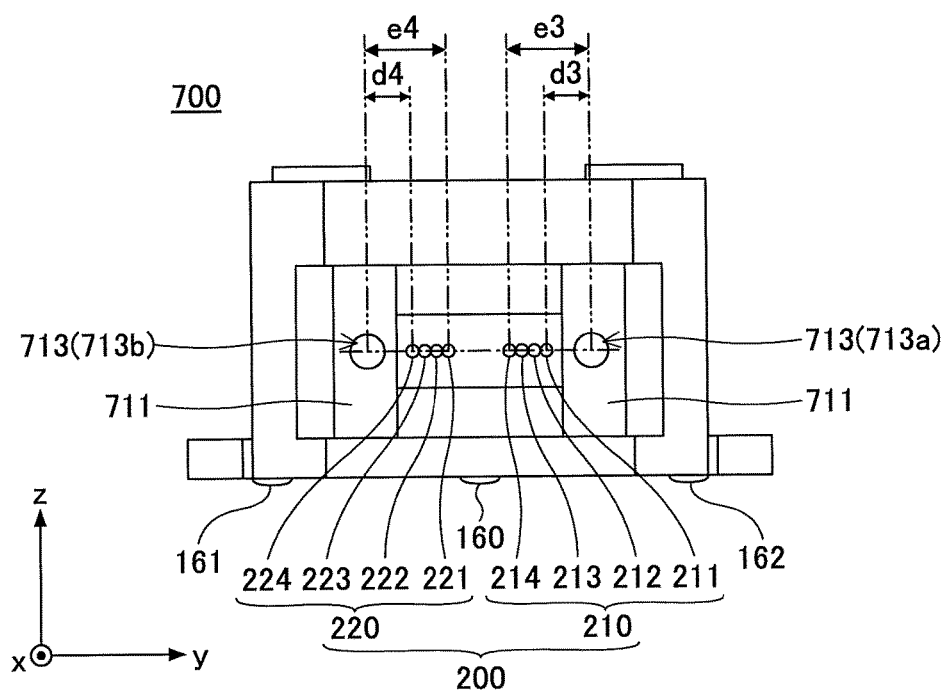
FIG. 12 is a schematic diagram illustrating the optical module of the second embodiment.
Figure 13:
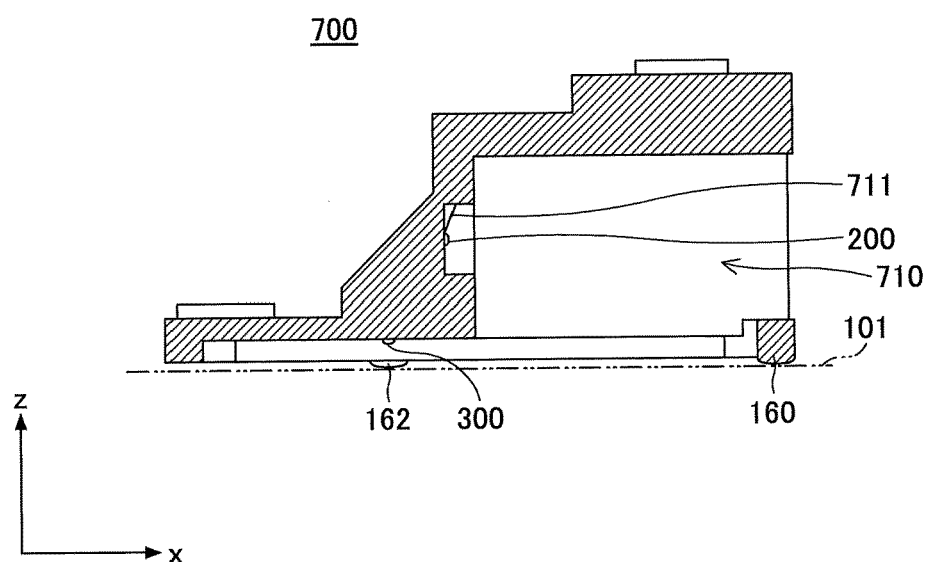
FIG. 13 is a cross-sectional view of the optical module of the second embodiment.

Next, an optical module 70 according to a second embodiment of the present invention is described. FIG. 10 is a perspective view of the optical module 700 of the second embodiment. FIG. 11 is a bottom view of the optical module 700. FIG. 12 is a rear view of the optical module 700. FIG. 13 is a cross-sectional view of the optical module 700.

As illustrated in FIG. 10 to FIG. 13, similar to the first embodiment, the optical module 700 includes an insertion hole 710 to which a part of the MT ferrule 140 is inserted.

A bottom plane 711 is formed in the far end of the insertion hole 710. A part of the front end plane 142 of the MT ferrule 140 inserted into the insertion hole 710 contacts a part of the insertion hole 710. The guide pin 143 of the MT ferrule 140 inserted into the insertion hole 710 enters and engages the guide hole 713 formed in the bottom plane 711. In the optical module 700 of the second embodiment, the bottom plane 711 is formed as a plane inclined relative to the plane 101 parallel to the surface of the printed board 400.

Therefore, an edge of the guide hole 713 can be clearly seen from the bottom plane 170. Thereby, the shape of the guide hole 713 can be accurately observed. Because the guide hole 713 is formed in the inclined bottom plane 711, the guide hole 713 observed through the bottom plane 711 is recognized as having an elliptical shape elongated in the vertical direction of FIG. 11 in correspondence with the angle of the inclination of the inclined bottom plane 711. Thus, because the guide hole 713 has an elliptical shape by looking through the optical module 100, the position of the line passing through the center of the guide hole 713 can be determined more easily compared to the first embodiment.

In the optical module 700, the guide holes 713 are used for determining the positions of the emitting lens 310 and the incident lens 320. The position of the guide hole 713 can be measured by observing the guide holes 713 from the bottom side of the optical module 700. Further, positional deviation of the lens relative to a desired position and the amount of deviation can be determined by measuring the distance between each lens and the position of the guide hole 713.

The position of the emitting lens 310 can be measured based on the center of a first guide hole 713a. That is, the position of the emitting lens 310 can be obtained by measuring the center of the first guide hole 713a, measuring the length a3 along y-axis from the center of the first guide hole 713a to the center of the lens 311 nearest to the first guide hole 713a, and measuring the length b3 along y-axis from the center of the first guide hole 713a to the center of the lens 314 farthest from the first guide hole 713a.

By measuring the lengths a3 and b3, whether the emitting lens 310 is appropriately positioned in the y-axis direction can be determined.

The position of the incident lens 320 can be inspected in a similar manner. The position of the incident lens 320 can be measured based on the center of the second guide hole 713b. That is, the position of the incident lens 320 can be obtained by measuring the center of the second guide hole 713b, measuring the length a4 along y-axis from the center of the second guide hole 713b to the center of the lens 324 nearest to the second guide hole 713b, and measuring the length b4 along y-axis from the center of the second guide hole 713b to the center of the lens 321 farthest from the first guide hole 713b.

By measuring the lengths a4 and b4, whether the incident lens 320 is appropriately positioned in the y-axis direction can be determined.

In the second embodiment, the length c3 in along x-axis from the center of the guide hole 713 to the center of the emitting lens 310 and to the center of the incident lens 320 can be measured. Because the guide hole 713 seen from the bottom plane of the optical module 700 has an elliptical shape that is elongated in the y-axis direction, the line passing through the center of the guide hole 713 can be easily identified by referring to the longitudinal diameter of the elliptical shape. By comparing the center of the guide hole 713 and the position of each lens, positional deviation of each lens in x-axis can be determined.

By measuring the length c3, whether the emitting lens 310 and the incident lens 320 are appropriately positioned in the x-axis direction can be determined.

In the second embodiment, the positions of the incident lens 210 and the emitting lens 220 of the first lens group 200 can be recognized from the rear surface of the optical module 700 by using the center of the guide hole 713 as a reference.

The position of the incident lens 210 can be measured from the center of one of the guide holes 713 (first guide hole 713a) as illustrated in FIG. 12. That is, the length d3 along y-axis from the center of the first guide hole 713a to the center of the lens 211 nearest to the first guide hole 713a and the length e3 along y-axis from the center of the first guide hole 713a to the center of the lens 214 farthest from the first guide hole 713a can be measured.

By measuring the lengths d3 and e3, whether the incident lens 210 is appropriately positioned in the y-axis direction can be determined.

The position of the emitting lens 220 can be inspected in a similar manner. The position of the emitting lens 220 can be measured from the center of the other one of the guide holes 713 (second guide hole 713b) as illustrated in FIG. 12. That is, the length d4 along y-axis from the center of the second guide hole 713b to the center of the lens 224 nearest to the second guide hole 713b, and the length e4 along y-axis from the center of the second guide hole 713b to the center of the lens 221 farthest from the second guide hole 713b can be measured.

By measuring the lengths d4 and e4, whether the emitting lens 220 is appropriately positioned in the y-axis direction can be determined.

Further, whether each lens is positioned in a desired position in the z-axis direction can be determined using the centers of the two guide holes 713 as references.

The positions of the incident lens 210 and the emitting lens 220 of the first lens group 200 and the positions of the incident lens 310 and emitting lens 320 of the second lens group 300 in the z-axis direction can be measured by using the guide hole 713 as reference because the guide hole 713 is a hole to which the guide pin 143 is inserted. Thereby, whether the positions of the first lens group 200 and of the second lens group 300 match the centers of the optical axes of the light propagating through the optical fiber connected to the MT ferrule 140 can be recognized. Accordingly, with the optical module 700, whether the first lens group 200 and the second lens groups 200 are in positions with hardly any optical loss can be determined.

Because the guide hole 713 is formed in the bottom plane 711 having a slope that is inclined relative to an orthogonal direction of the plane 101, the shape of the guide hole 713 can be accurately observed as an edge of the guide hole 713 at the bottom plane 711 can be clearly observed from the bottom plane 170. Thereby, the center of the guide hole 713 can be accurately recognized, and the positions of the first lens group 200 and of the second lens group 300 can also be accurately recognized.

Figure 14:
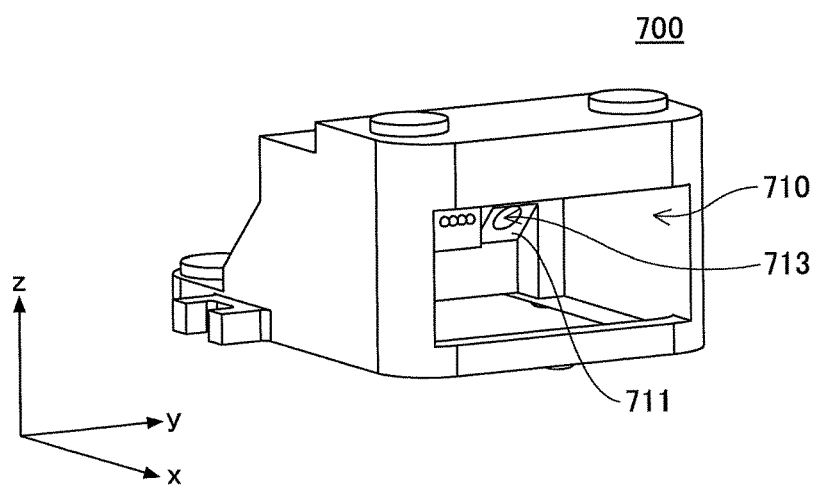
FIG. 14 is a schematic diagram illustrating the optical module of the second embodiment.
Figure 15:
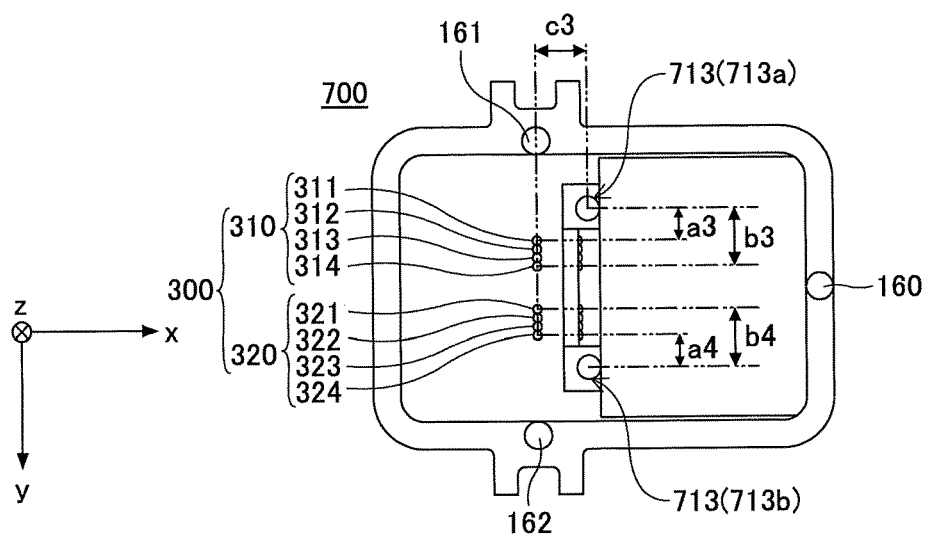
FIG. 15 is a schematic diagram illustrating the optical module of the second embodiment.
Figure 16:
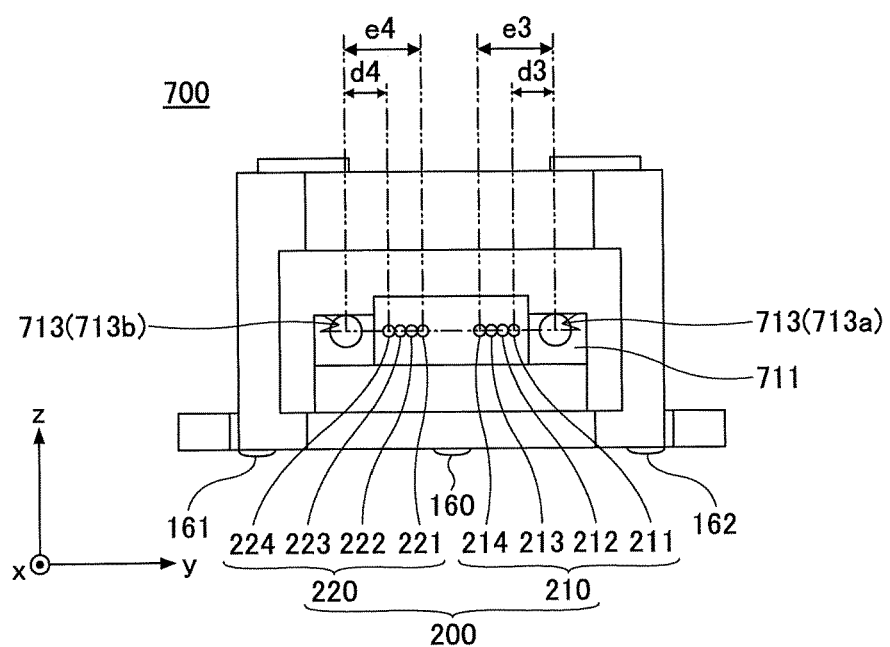
FIG. 16 is a schematic diagram illustrating the optical module of the second embodiment.
Figure 17:
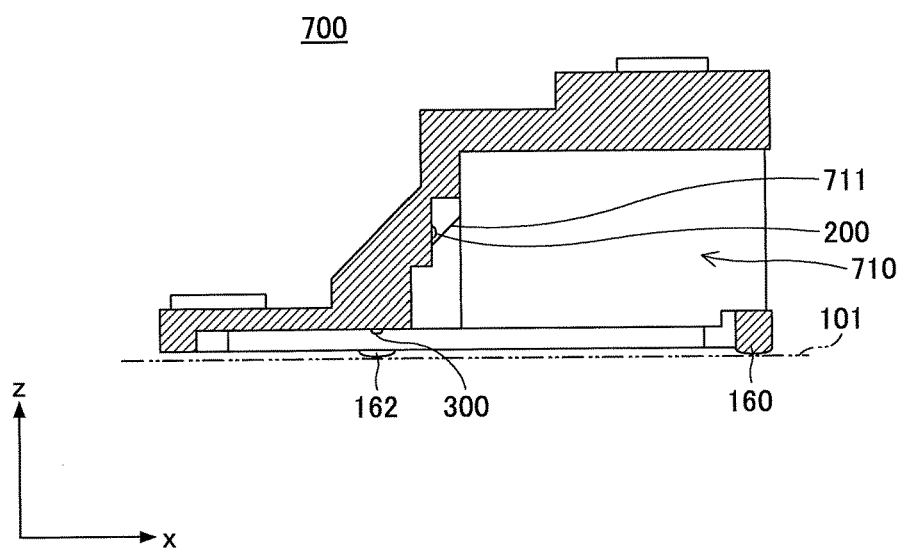
FIG. 17 is a cross-sectional view of the optical module of the second embodiment.

FIG. 14 is a perspective view of the optical module 700 according to a modified example of the second embodiment. FIG. 15 is a bottom view of the optical module 700 according to the modified example. FIG. 16 is a rear view of the optical module 700 according to the modified example. FIG. 17 is a cross-sectional view of the optical module 700 according to the modified example.

In a modified example of the second embodiment, the bottom plane 711 may be formed to have a slope that is inclined at an angle of 45 degrees relative to the flat plane 101 as illustrated in FIGS. 14 to 17. With the modified examples illustrated in FIGS. 14 to 17, inspection can be performed more easily because the shape of the guide hole 713 observed from the bottom plane 170 becomes circular as illustrated in FIG. 15.

<Third Embodiment>

Figure 18:
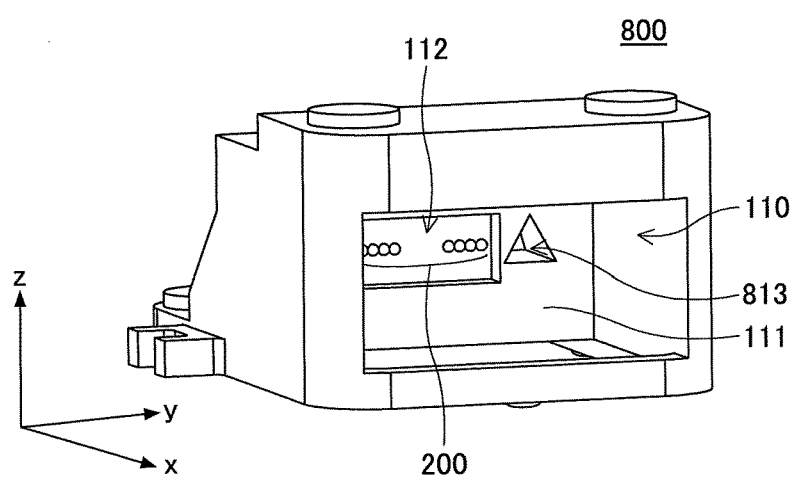
FIG. 18 is a schematic diagram illustrating an optical module of the third embodiment.
Figure 19:
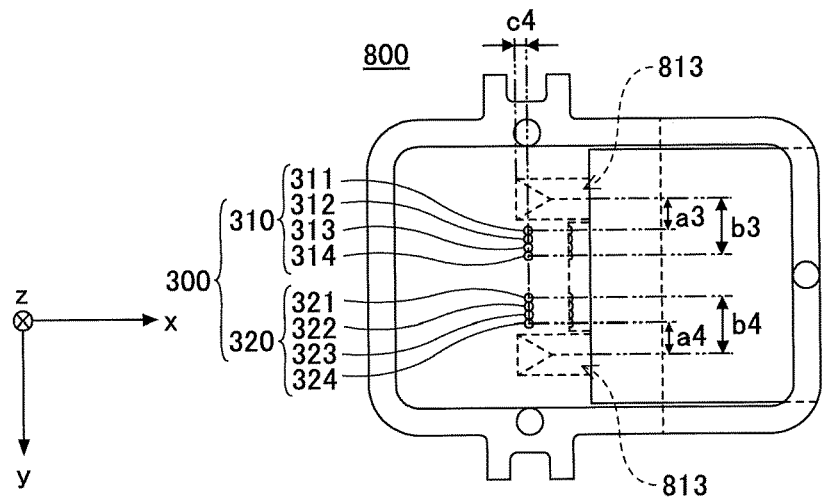
FIG. 19 is a schematic diagram illustrating the optical module of the third embodiment.
Figure 20:
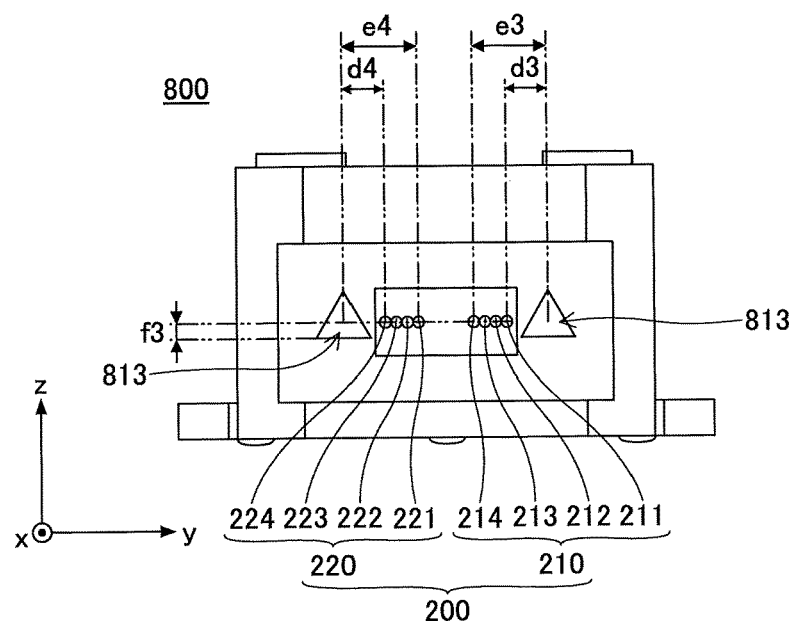
FIG. 20 is a schematic diagram illustrating the optical module of the third embodiment.
Figure 21:
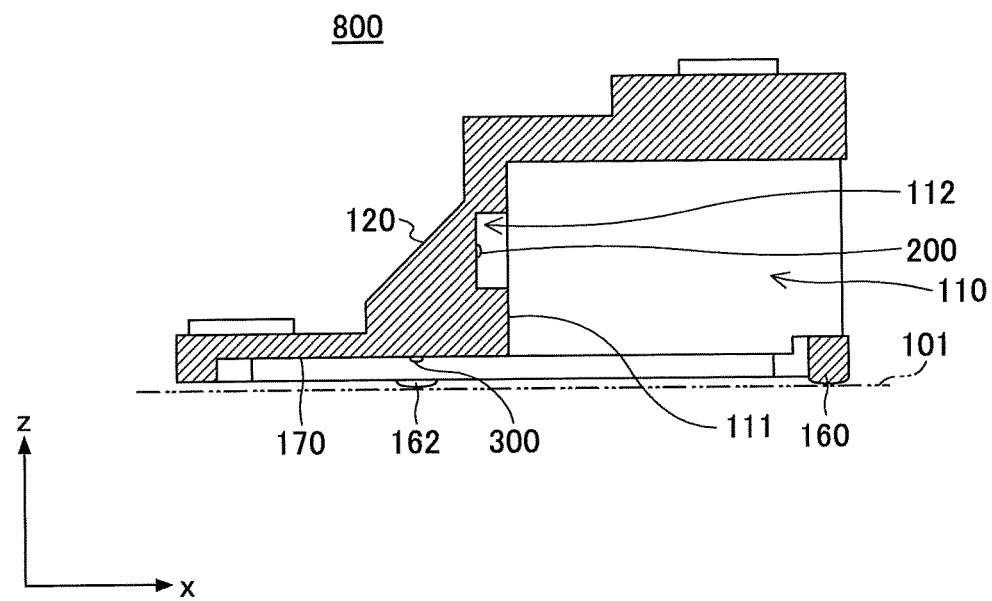
FIG. 21 is a cross-sectional view of the optical module of the third embodiment.

Next, an optical module 800 according to the third embodiment of the present invention is described. FIG. 18 is a perspective view of the optical module 800 of the third embodiment. FIG. 19 is a bottom view of the optical module 800. FIG. 20 is a rear view of the optical module 800. FIG. 21 is a cross-sectional view of the optical module 800.

As illustrated in FIGS. 18 to 21, the optical connector 800 includes an equilateral triangular shaped guide hole 813 to which the guide pin 143 of the MT ferrule 140 is inserted. In the third embodiment, the guide pin 143 is inserted into the guide hole 813 in a manner that the guide pin 143 is inscribed in the guide hole 813 as illustrated in FIG. 22.

Figure 22:
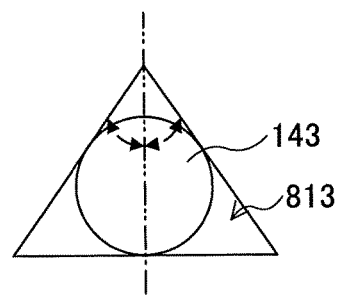
FIG. 22 is a schematic diagram illustrating a guide hole of the third embodiment.

Because the guide hole 813 has an equilateral triangular shape, the center line of the equilateral triangle illustrated in FIG. 22 with a double-dot chained line runs through the center of the guide hole 813.

The center line running along x-axis through the right end corner of the equilateral triangle illustrated in FIG. 22 runs through the center of the guide hole 813 in the y-axis direction. Therefore, the position of the second lens group 300 in the y-axis direction can be determined based on the center line of the equilateral triangle.

The position of the emitting lens 310 in the y-axis direction can be determined by measuring the distance a3 in the y-axis direction between the center line running in x-axis direction through the right-end corner of the guide hole 813 illustrated on the upper side of FIG. 19 and the lens 311 of the emitting lens 310 nearest to the guide hole 813, and measuring the distance b3 in the y-axis direction between the center line of the guide hole 813 on the upper side and the lens 311 of the emitting lens 310 farthest from the guide hole 813.

Similarly, the position of the incident lens 320 in the y-axis direction can be determined by measuring the distance a4 in the y-axis direction between the center line running along x-axis through the right-end corner of the guide hole 813 illustrated on the lower side of FIG. 19 and the lens 324 of the incident lens 320 nearest to the guide hole 813, and measuring the distance b4 in the y-axis direction between the center line of the guide hole 813 on the lower side and the lens 321 of the emitting lens 320 farthest from the guide hole 813.

Further, as illustrated in FIG. 20, the position of the first lens group 200 in the y-axis direction can be determined by measuring the distance d3 between the center line running in z-axis direction through the upper end corner of the guide hole 813 and the lens 211 of the incident lens 210, the distance e3 between the center line of the guide hole 813 and the lens 214 of the incident lens 210, the distance d4 between the center line of the guide hole 813 and the lens 224 of the emitting lens 220, and the distance e4 between the center line of the guide hole 813 and the lens 221 of the emitting lens 220, respectively.

On the other hand, the position of each lens of the second lens group 300 in the x-axis direction can be determined by measuring the distance c4 in the x-axis direction between each lens of the second lens group 300 and the left end side of the equilateral triangle of the guide hole 813 of FIG. 19. Similarly, the position of each lens of the first lens group 200 in the z-axis direction can be determined by measuring the distance f3 in the z-axis direction between each lens of the first lens group 200 and the lower end side of the equilateral triangle of the guide hole 813 of FIG. 20.

Thus, by measuring the above-described distances, whether the incident lens 210 and the emitting lens 220 are appropriately positioned can be determined.

<Fourth Embodiment>

Figure 23:
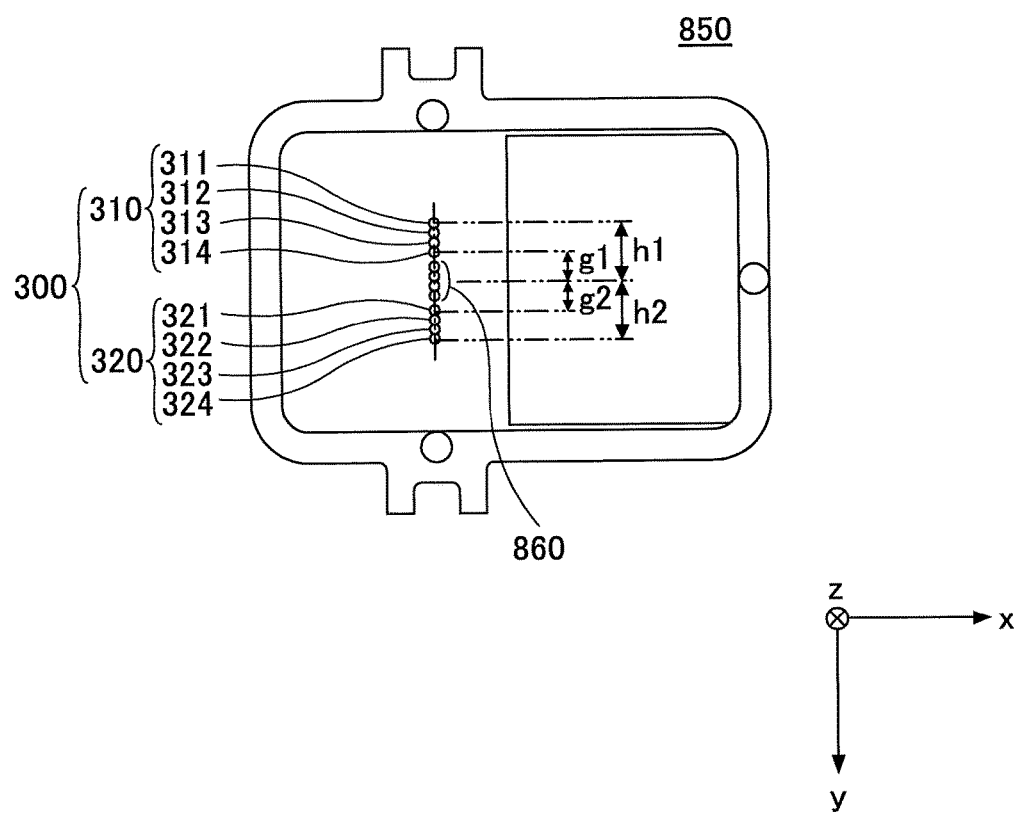
FIG. 23 is a schematic diagram illustrating an optical module of the fourth embodiment.
Figure 24A:
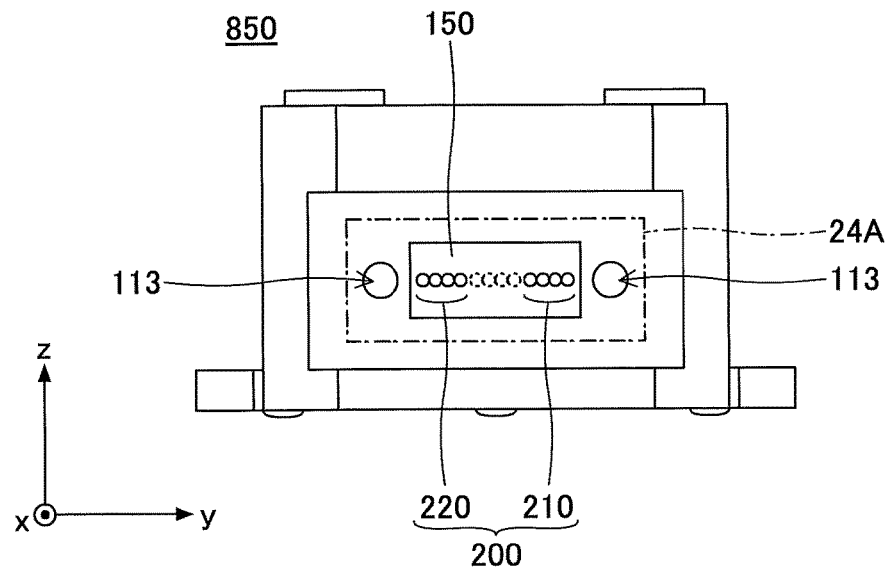
FIGS. 24A and 24B are schematic diagrams illustrating the optical module of the fourth embodiment.
Figure 24B:
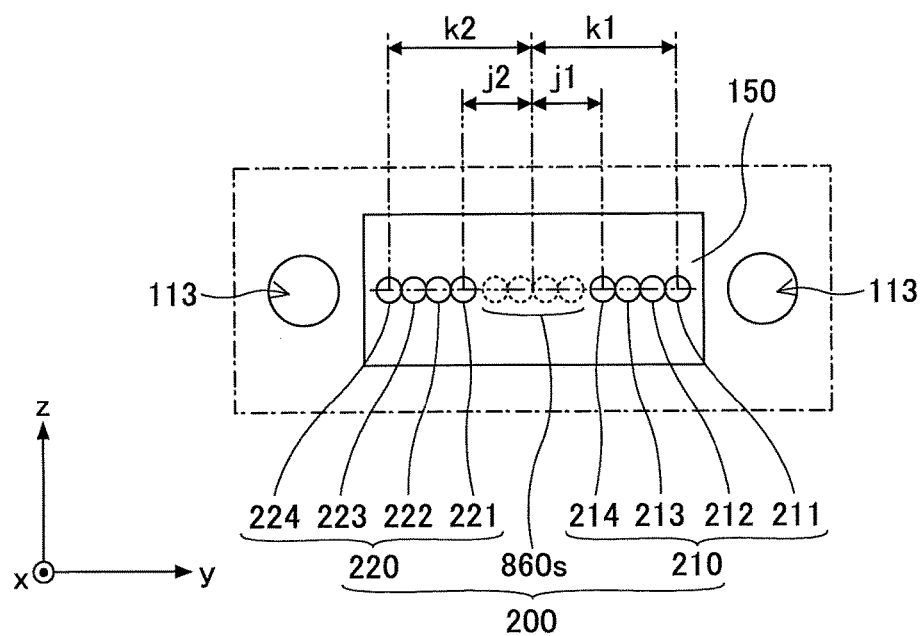

An optical module 850 according to the fourth embodiment of the present invention is described. FIG. 23 is a schematic diagram illustrating an optical module of the fourth embodiment. FIG. 24A is a rear view of the optical module 850. FIG. 24B is an enlarged view of the area surrounded by the chain line 24A of FIG. 24A.

As illustrated in FIG. 23, the optical module 850 of the fourth embodiment includes a dummy lens group ("dummy lenses") 860 that is provided between the emitting lens 310 and the incident lens 320 and formed along a direction in which the emitting lens 310 and the incident lens 320 are arranged. In the example illustrated in FIG. 23, four dummy lenses 860 are provided along y-axis between four emitting lenses 310 and four incident lenses 320.

In a case where no dummy lens is provided in the optical module 850 formed by injection molding, the lens 311 or the lens 314 are susceptible to deformation caused by molding (molding deformation) because the lens 311 or the lens 314 are formed at the ends of the emitting lens 310. As a result, the lens 311 or the lens 314 may be formed into an undesired shape. Such deformation is considered to be caused because another lens is only formed on one side of the lens 311 or the lens 314 whereas another lenses are formed on both sides of the lens 312 and the lens 313. Such deformed lenses may lead to undesired optical loss. The same applies to the lens 321 or the lens 324 of the incident lens 320.

Therefore, in the optical module 850, the dummy lenses 860 are provided between the emitting lens 310 and the incident lens 320 and formed along a direction in which the emitting lens 310 and the incident lens 320 are arranged to prevent molding deformation of the emitting lens 310 and the incident lens 320.

Further, whether the second lens group 300 is appropriately position can be determined by forming the dummy lenses 860 and measuring the positions of the emitting lens 310 and the incident lens 320 based on the position of the dummy lenses 860.

The length g1 along y-axis between the middle of the four dummy lenses aligned in the y-axis direction of FIG. 23 (i.e., position between the two dummy lenses on the upper side and the two dummy lenses on the lower side of FIG. 23) and the center of the lens 314 and the length h1 along y-axis between the middle of the four dummy lenses and the center of the lens 314 are measured.

Similarly, the length g2 along y-axis between the middle of the four dummy lenses and the center of the lens 321 and the length h2 along y-axis between the middle of the four dummy lenses and the center of the lens 324 of the incident lens 320 are measured. Thereby, whether the second lens group 300 is appropriately positioned in the y-axis direction can be determined based on the measured lengths g1, h1, g2, and h2. Further, whether each of the lenses 310, 320 is appropriately positioned in the x-axis direction can be determined based on the direction in which the dummy lenses 860 are arranged, e.g., based on the direction in which the centers of each of the dummy lenses 860 are arranged.

Assuming that the center of the dummy lenses 860 and the center of each of the lenses 310, 320 are positioned on the same straight line along y-axis, whether the center of each of the lenses 310, 320 is positioned on an imaginary line connecting the centers of the dummy lenses can be determined by measuring the distances between the center of the dummy lens and the position of each of the lenses 310, 320 and comparing the measured distances.

Further, an image 860s of the dummy lenses 860 is reflected from the mirror 120 and is projected to the bottom plane 150 as illustrated in FIG. 24B. Therefore, whether the first lens group 200 is appropriately position can be determined by measuring the positions of the incident lens 210 and the emitting lens 220 based on the image 860s of the dummy lenses 860 projected to the bottom plane 150 as illustrated in FIGS. 24A and 24B.

The length j1 between the middle of the images 860s of the four dummy lenses (i.e., position between the images 860s of two dummy lenses on the right side of FIG. 24B and the images 860s of two dummy lenses on the left side of FIG. 24B) and the center of the lens 214 along y-axis, and the length k1 between the middle of the images 860s of the four dummy lenses and the center of the lens 211 along y-axis are measured.

Similarly, the length j2 along y-axis between the middle of the images 860s of the four dummy lenses and the center of the lens 221 of the emitting lens 220 and the length k2 along y-axis between the middle of the images 860s of the four dummy lenses and the center of the lens 224 of the emitting lens 220 are measured. Thereby, whether the first lens group 200 is appropriately positioned in the y-axis direction can be determined based on the measured lengths j1, k1, j2, and k2.

Further, whether each of the lenses 210, 220 is appropriately positioned in the z-axis direction can be determined based on the direction in which four dummy lenses 860 are arranged, e.g., based on the direction in which the centers of each of the dummy lenses 860 are arranged. Assuming that the centers of the images of each of the dummy lenses 860 and the center of each of the lenses 210, 220 are positioned on the straight line along y-axis, whether the center of each of the lenses 210, 220 is positioned on an imaginary line connecting the centers of the image 860s of the dummy lenses 860 can be determined by measuring the distances between the center of the image 860s of the dummy lens and the position of each of the lenses 210, 220 and comparing the measured distances.

Figure 25:
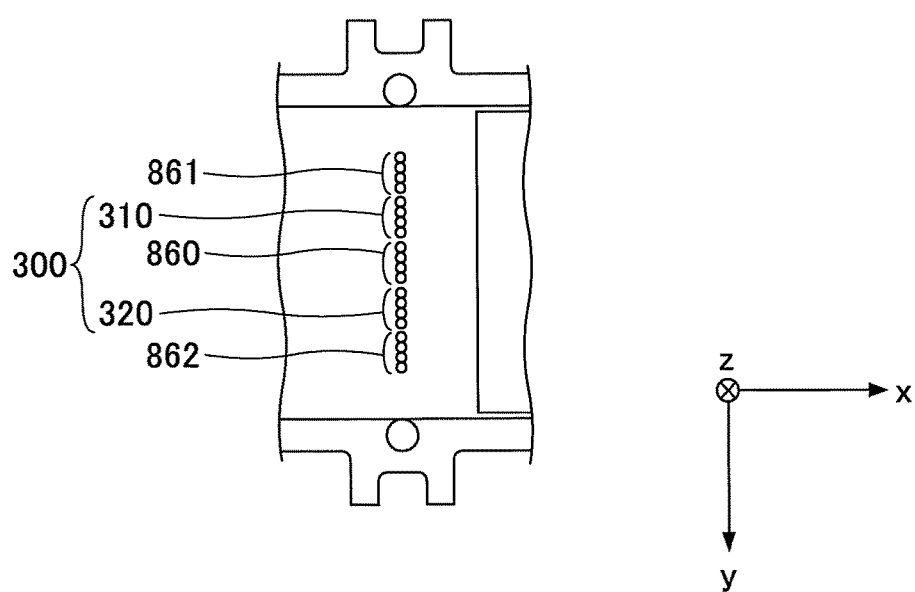
FIG. 25 is a schematic diagram illustrating the optical module of the fourth embodiment.

In the fourth embodiment, the dummy lenses 861, 862 may be formed at the outer side of the second lens group 300 along a direction in which the lenses 310, 320 are aligned as illustrated in FIG. 25. This further prevents the emitting lens 310 or the incident lens 320 from deformation during molding.

Further, in the fourth embodiment, the dummy lenses may be provided between the incident lens 210 and the emitting lens 220.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module for connecting a ferrule for connecting an optical fiber and a photoelectric transducer mounted on a substrate, the optical module comprising:
    a plurality of first lenses provided on a first side of the optical module to which the ferrule is to be connected;
    a plurality of second lenses provided on a second side of the optical module facing a surface of the substrate;
    an inclined plane inclined with respect to the surface of the substrate, the inclined plane functioning as a mirror configured to reflect light between the plurality of first lenses and the plurality of second lenses; and
    a dummy lens provided on the second side of the optical module,
    wherein the plurality of second lenses and the dummy lens are aligned on a same line, and
    an image of the dummy lens is reflected from the mirror to be projected onto a plane on the first side of the optical module.

2. The optical module as claimed in claim 1, wherein the dummy lens is provided between a third lens and a fourth lens among the plurality of second lenses.

* * * * *